United States Patent
Rafferty et al.

(10) Patent No.: US 12,467,229 B2
(45) Date of Patent: Nov. 11, 2025

(54) WORK MACHINE STABILIZATION

(71) Applicant: Caterpillar Inc., Peoria, IL (US)

(72) Inventors: Jonathan Rafferty, Pascoe Vale (AU); Aaron Westbury, Wynyard (AU)

(73) Assignee: Caterpillar Inc., Peoria, IL (US)

( * ) Notice: Subject to any disclaimer, the term of this patent is extended or adjusted under 35 U.S.C. 154(b) by 124 days.

(21) Appl. No.: 18/413,882

(22) Filed: Jan. 16, 2024

(65) Prior Publication Data
US 2025/0230631 A1  Jul. 17, 2025

(51) Int. Cl.
*E02F 9/20* (2006.01)
*E02F 9/24* (2006.01)
*E02F 9/26* (2006.01)

(52) U.S. Cl.
CPC .............. *E02F 9/2029* (2013.01); *E02F 9/24* (2013.01); *E02F 9/264* (2013.01)

(58) Field of Classification Search
CPC ............ E02F 9/2029; E02F 9/24; E02F 9/264
See application file for complete search history.

(56) References Cited

U.S. PATENT DOCUMENTS

| | | | |
|---|---|---|---|
| 6,132,163 A | 10/2000 | Andrews et al. | |
| 10,132,259 B1* | 11/2018 | Watson | F02N 11/101 |
| 12,029,156 B1* | 7/2024 | Simpson | A01D 34/008 |
| 2015/0176253 A1 | 6/2015 | Taylor et al. | |
| 2018/0186197 A1* | 7/2018 | Tsiberidou | B29C 73/166 |
| 2019/0234790 A1* | 8/2019 | Sherlock | B60C 23/0474 |
| 2020/0071908 A1 | 3/2020 | Cherney et al. | |
| 2021/0317632 A1 | 10/2021 | Ito et al. | |
| 2021/0332555 A1* | 10/2021 | Metzger | E02F 9/2296 |
| 2022/0381008 A1 | 12/2022 | Yamawaki | |
| 2023/0359203 A1* | 11/2023 | Shatters | G05D 1/0891 |
| 2023/0359209 A1* | 11/2023 | Shatters | G05D 1/0223 |
| 2024/0410134 A1* | 12/2024 | Ruemelin | E02F 9/128 |

(Continued)

FOREIGN PATENT DOCUMENTS

| | | |
|---|---|---|
| CN | 105174139 A | 12/2015 |
| CN | 104648051 B | 3/2018 |
| CN | 107767490 A | 3/2018 |

(Continued)

OTHER PUBLICATIONS

Written Opinion and International Search Report for Int'l. Patent Appln. No. PCT/US2024/059693, mailed Apr. 1, 2025 (14 pgs).

*Primary Examiner* — Tyler J Lee

(57) ABSTRACT

In some implementations, a control system may monitor load information of the work machine, the load information including: first tire pressure information of a first one or more tires, second tire pressure information of a second one or more tires, and fluid pressure information of one or more actuators configured to actuate the work tool. The control system may detect a destabilization event of the work machine based on: a change in tire pressure of the first one or more tires satisfying a first tire pressure threshold, a change in tire pressure of the second one or more tires satisfying a second tire pressure threshold, and a change in fluid pressure of the one or more actuators satisfying a fluid pressure threshold. The control system may perform, based on detecting the destabilization event, one or more actions.

20 Claims, 4 Drawing Sheets

(56) References Cited

U.S. PATENT DOCUMENTS

2025/0209871 A1\* 6/2025 Keller .................... G07C 5/008

FOREIGN PATENT DOCUMENTS

| CN | 106544954 | B  | 6/2018 |
| CN | 115450278 | B  | 9/2023 |
| JP |   3130377 | B2 | 1/2001 |
| KR |  101489018 | B1 | 2/2015 |

\* cited by examiner

WORK MACHINE STABILIZATION

TECHNICAL FIELD

The present disclosure relates generally to work machines and, for example, to work machine stabilization.

BACKGROUND

A work machine may include one or more work tools for performing operations, such as digging, excavating, grading, loading materials, and/or paving, among other examples. For example, a work tool may include a bucket configured for digging, trenching, and/or other material handling. In some scenarios, operation of the work tool may cause the work machine to become destabilized. For example, the work tool may contact a work surface (e.g., the ground) during operation and exert force on the work surface, causing a destabilization of the work machine. For example, the work tool contacting the work surface may cause one or more tires of the work machine to lift from the work surface, may cause a reduction in operator control of the work machine, may cause the work tool to dig into the work surface, and/or may cause a reduction in the work tool efficiency, among other examples.

However, it may be difficult to detect when destabilization events that are caused by work tool operation occur. For example, a system of the work machine may determine that the work tool is at work surface level (e.g., at ground level) using a position of a linkage system of the work tool. For example, the system may use the geometry of the linkage system to determine that the work tool is at ground level. However, work surfaces are often uneven. As a result, using the geometry of the linkage system may be an unreliable mechanism to determine when the work tool is at work surface level (e.g., at ground level). Additionally, the work machine may be autonomous and/or remotely operated. Therefore, an operator may be unable to detect when destabilization events that are caused by work tool operation occur because the operator may not be in a cab of the work machine. The operator may be unable to detect movement of the work machine that is indicative of a destabilization event.

As a result, the work machine may be destabilized, damage to the work machine and/or work tool can occur, and/or an efficiency of an operation of the work machine and/or the work tool may be reduced. For example, the work tool contacting the work surface (e.g., the ground) during operation may cause damage to the work tool and/or may cause the operator to have reduced control over the work machine. For example, the work tool contacting the work surface (e.g., the ground) during operation may cause less weight to be placed on the front tires of the work machine, resulting in reduced steering response, reduced traction, and/or reduced effectiveness of a braking system of the work machine, among other examples. Further, environments in which the work machine operates may not be conducive to ground level detection systems (e.g., a system configured to detect where ground level is relative to the work tool), such as light detection and ranging (LiDAR) systems, camera systems, and/or radar systems, among other examples. For example, the environments in which the work machine operates may have harsh conditions (such as airborne debris and/or frequent impact with walls or other structures) resulting in damage to a ground level detection system and/or reducing an effectiveness of the ground level detection system.

China Patent No. 106544954B (the '954 patent) discloses a leg control system for a bridge inspection vehicle. The '954 patent discloses a control unit that uses tire pressure value detected according to a detection part. The control unit calculates each individual tire relative to a tire pressure variable quantity before operation, and judges whether a current tire pressure variable quantity is in a predetermined safe range. If the current tire pressure is not in the predetermined safe range, a vertical leg to the working machine is adjusted until the tire pressure variable quantity is in the predetermined safe range.

However, the '954 patent does not detect destabilization of a work machine caused by operation of a work tool. The system for work machine stabilization of the present disclosure solves one or more of the problems set forth above and/or other problems in the art.

SUMMARY

A work machine may include a work tool that is configured to be actuated via one or more actuators; a first one or more tires; a second one or more tires that are positioned further from the work tool relative to the first one or more tires; and one or more controllers configured to: monitor, via one or more monitoring systems, load information of the work machine, the load information including: first tire pressure information of the first one or more tires, second tire pressure information of the second one or more tires, and fluid pressure information of the one or more actuators; detect a destabilization event of the work machine based on: a first difference in tire pressure, indicated by the first tire pressure information, of the first one or more tires satisfying a first tire pressure threshold, a second difference in tire pressure, indicated by the second tire pressure information, of the second one or more tires satisfying a second tire pressure threshold, and a difference in fluid pressure, indicated by the fluid pressure information, of the one or more actuators satisfying a fluid pressure threshold; and perform, based on the detection of the destabilization event, one or more actions.

A system for work machine stabilization may include one or more controllers configured to: monitor, during a work operation associated with a work tool of a work machine, tire pressure information indicating: a first one or more tire pressures of a first one or more tires of the work machine, and a second one or more tire pressures of a second one or more tires of the work machine, wherein the first one or more tires are positioned on the work machine closer to the work tool relative to the second one or more tires; monitor, during the work operation, fluid pressure information indicating one or more fluid pressures of one or more actuators that are configured to move the work tool; detect a destabilization event of the work machine based on: a first relative difference in the first one or more tire pressures during the work operation satisfying a first tire pressure threshold, a second relative difference in the second one or more tire pressures during the work operation satisfying a second tire pressure threshold, and a third relative difference in the one or more fluid pressures during the work operation satisfying a fluid pressure threshold; and perform, based on the destabilization event, one or more actions.

A method for stabilizing a work machine having a work tool may include monitoring, by a control system of the work machine, load information of the work machine, the load information including: first tire pressure information of a first one or more tires, second tire pressure information of a second one or more tires that are positioned further from the work tool relative to the first one or more tires, and fluid pressure information of one or more actuators configured to actuate the work tool; detecting, by the control system, a destabilization event of the work machine based on: a decrease in tire pressure, indicated by the first tire pressure information, of the first one or more tires satisfying a first tire pressure threshold, an increase in tire pressure, indicated by the second tire pressure information, of the second one or more tires satisfying a second tire pressure threshold, and an increase in fluid pressure, indicated by the fluid pressure information, of the one or more actuators satisfying a fluid pressure threshold; and performing, by the control system and based on detecting the destabilization event, one or more actions.

DETAILED DESCRIPTION

This disclosure relates to a system for work machine stabilization, which is applicable to any work machine that includes a work tool. For example, the work machine described herein may be a vehicle, a load-haul-dump (LHD) loader, a mining truck (e.g., an underground mining truck), an articulated truck, a material loader (e.g., a material handler), a telescopic handler (e.g., a telehandler or a reach forklift), a backhoe loader, a wheel loader, a harvester, an excavator, a motor grader, a skid steer loader, a tractor, a compactor machine, a paving machine, a cold planer, a dragline, a drill, a mining shovel, a forest machine, a pipelayer, a grading machine, and/or a dozer, among other examples.

Figure 1:
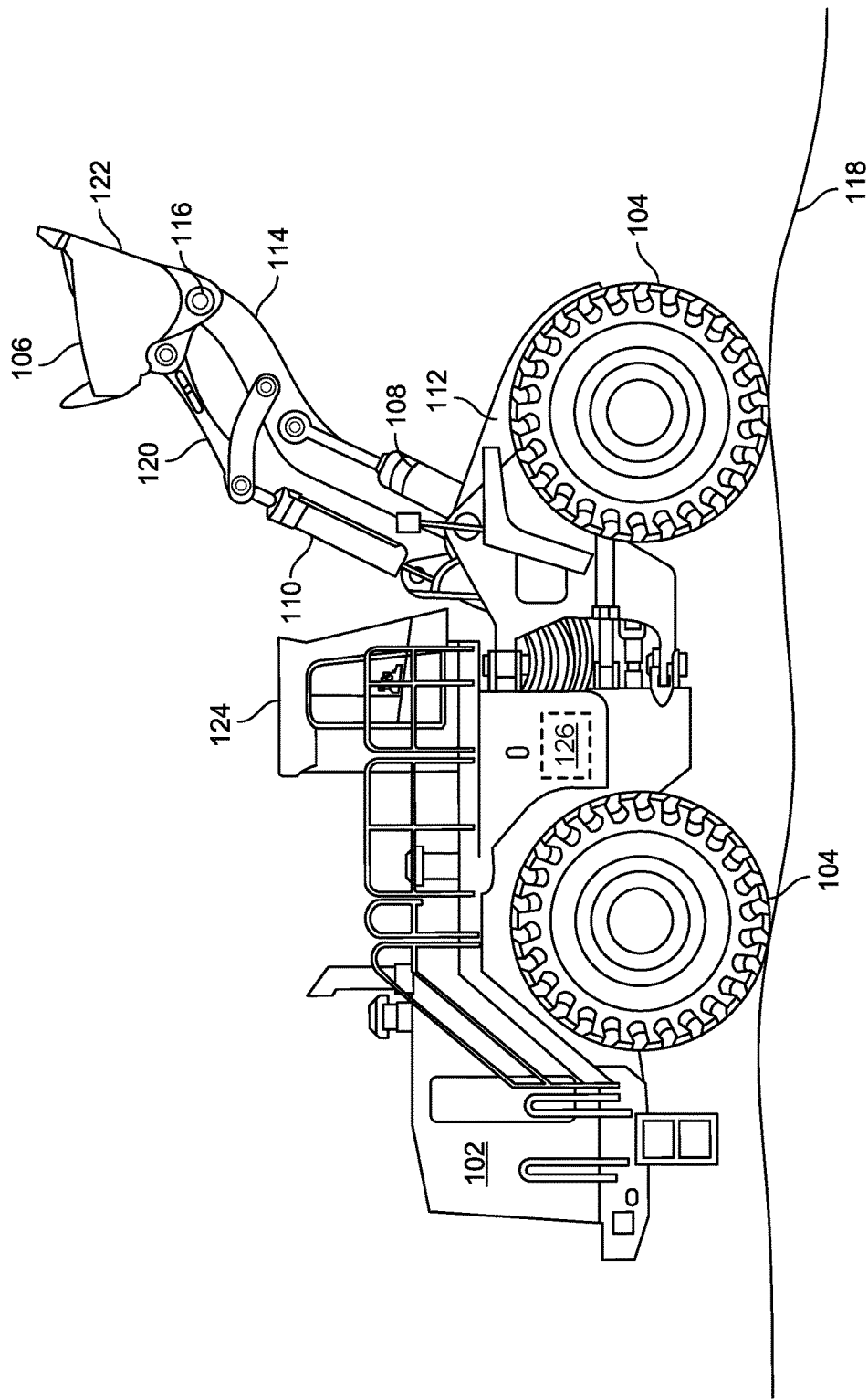
FIG. 1 is a diagram of an example work machine described herein.

FIG. 1 is a diagram of an example work machine 100 described herein. The work machine 100 is depicted in FIG. 1 as an LHD loader as an example. In other examples, the work machine 100 may be another type of work machine, such as a work machine described above. The work machine 100 may operate in a work site. The work site may include an underground (or below-ground) work site (e.g., an underground mine), an above-ground work site, a construction site, a mining site, and/or another type of work site.

The work machine 100 may include a power source 102, one or more traction devices 104 (e.g., wheels or tires), a work tool 106, one or more lift actuators 108, and/or one or more tilt actuators 110, among other examples. The actuator(s) (e.g., the one or more lift actuators 108, and/or the one or more tilt actuators 110) may be hydraulic cylinders, pneumatic actuators, electrical actuators, and/or mechanical actuators, among other examples. Lift actuator(s) 108 and tilt actuator(s) 110 may connect the work tool 106 to a frame 112 of the work machine 100. In one example, the lift actuator(s) 108 may have one end connected to the frame 112 and an opposite end connected to a structural member 114, which may be connected to the work tool 106. The work tool 106 may be connected to the structural member 114 via pivot pin 116. The lift actuator(s) 108 may be configured to lift or raise the work tool 106 to a desired height above a work surface 118 (e.g., a ground surface). In one example, tilt actuator(s) 110 may have one end connected to the frame 112 and an opposite end connected to a linkage member 120, which may be connected to the work tool 106. The tilt actuator(s) 110 may be configured to alter an inclination of a lower surface 122 of the work tool 106 relative to the work surface 118.

The one or more traction devices 104 may include one or more wheels or one or more tires. In one example, the one or more traction devices 104 may include four tires (e.g., two front tires and two rear tires). In other examples, the one or more traction devices 104 may include a track system, one or more skids, or another type of traction device. The power source 102 may be supported by the frame 112 of the work machine 100, and may be configured to provide power to the one or more traction devices 104 via a mechanical or electromechanical drivetrain (not shown in FIG. 1). The power source 102 may include an engine (e.g., a combustion engine), a motor (e.g., an electric motor), a hybrid power source, and/or a battery system, among other examples. Power output by the power source 102 may be used to drive a pump (not shown) that supplies pressurized fluid to lift actuators 108, tilt actuators 110, and/or to one or more motors (not shown) associated with the one or more traction devices 104. The power source 102, in addition to driving work tool 106, may also function to propel the work machine 100, for example via the one or more traction devices 104.

The work tool 106 may an implement that may be used to manipulate and/or transport work material at a work site. As shown in FIG. 1, the work machine 100 is an LHD loader and the work tool 106 is a bucket. However, the work tool 106 may be any type of work tool, such as a blade, a plow, a backhoe, a fork, a broom, a cold planer, a compactor, a hammer, a material handler, a mulcher, a saw, a grinder, and/or a trencher, among other examples.

The work machine 100 may be operated in one or more alternative work modes to perform tasks at a worksite. The work machine 100 may have a manual mode where the work machine 100 is operated manually by an operator disposed in a cab 124 on the work machine 100. In a tele-remote mode, the work machine 100 may be operated remotely by an operator using video, audio, or other positioning and machine-related information to guide and control the work machine 100. In a line of site (LOS) mode, an operator may operate the machine remotely using a mobile (e.g., hand-held) remote control device within line of sight of the work machine 100. A semi-autonomous mode may allow a remote operator to operate the work machine 100 semi-autonomously using video, audio, or other positioning information and machine information to guide the work machine 100 as well as utilizing autonomous control for selected functions/operations of the work machine 100. In autonomous mode, the work machine 100 may be operated autonomously by a computer or computer system (e.g., a control system 126).

As shown in FIG. 1, the work machine 100 includes the control system 126. The control system 126 may be configured to perform and/or control one or more operations of the work machine 100. For example, the control system 126 may be configured to stabilize the work machine 100, as described herein. The control system 126 may be configured to control one or more operations of the work tool 106 and/or the work machine 100. The control system 126 may include a tire pressure monitoring system configured to monitor a pressure (e.g., a tire pressure) of one or more tires of the work machine 100 (e.g., included in the one or more traction devices 104). The control system 126 may include a fluid (e.g., hydraulic) control system configured to monitor and/or control one or more actuators (e.g., hydraulic cylinders) included in the work machine 100, such as the one or more lift actuators 108 and/or the one or more tilt actuators 110, among other examples. The control system 126 may include, or may communicate with, one or more monitoring systems of the work machine 100. The one or more monitoring systems may include a first monitoring system configured to monitor an air pressure (e.g., a tire pressure) of the one or more traction devices 104 (e.g., a tire pressure monitoring system), a second monitoring system configured to monitor a fluid pressure of one or more actuators (such as the one or more lift actuators 108 and/or the one or more tilt actuators 110), and/or a third monitoring system configured to monitor weight loads at one or more positions of the work machine 100, among other examples. The control system 126 may be configured to obtain information from one or more sensors included in the work machine 100 (e.g., the sensor(s) may be included in, or associated with, the one or more monitoring systems). The one or more sensors may include pressure sensors (e.g., air pressure sensors and/or fluid pressure sensors), one or more inertial measurement units (IMUs), and/or one or more load sensors (e.g., load cells or weight transducers), among other examples.

The control system 126 may be, or may be included in, a machine-level control unit of the work machine 100. For example, the control system 126 may be, or may be included in, an electronic control unit (ECU), an engine control unit (ECU), an engine control module (ECM), and/or another control unit of the work machine 100. In other examples, the control system 126 may be included in another part or component of the work machine 100. In some examples, the control system 126 may be separate from or may be located remotely from the work machine 100.

The control system 126 may include one or more controllers, one or more processors, and/or one or more memories. The one or more controllers and/or one or more processors may be communicatively connected (e.g., via a communication link) to other components of the work machine 100, such as one or more monitoring systems, one or more sensors, and/or an operator control component, among other examples. A processor may include a central processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. In some implementations, the processor may include one or more processors capable of being programmed to perform one or more operations or processes described elsewhere herein. A memory may include volatile and/or nonvolatile memory. For example, the memory may include random access memory (RAM), read only memory (ROM), and/or another type of memory (e.g., a flash memory, a magnetic memory, and/or an optical memory). The memory may include internal memory (e.g., RAM, ROM, or a hard disk drive) and/or removable memory (e.g., removable via a universal serial bus connection). The memory may be a non-transitory computer-readable medium. The memory may store information, one or more instructions, and/or software (e.g., one or more software applications) related to the operation of the work machine 100 and/or the work tool 106. The memory may include one or more memories that are coupled (e.g., communicatively coupled) to the processor, such as via a bus. Communicative coupling between a processor and a memory may enable the processor to read and/or process information stored in the memory and/or to store information in the memory.

As indicated above, FIG. 1 is provided as an example. Other examples may differ from what is described with regard to FIG. 1. For example, the work machine 100 may be a different type of work machine and/or the work machine 100 may operate in a different environment than depicted in FIG. 1.

Figure 2:
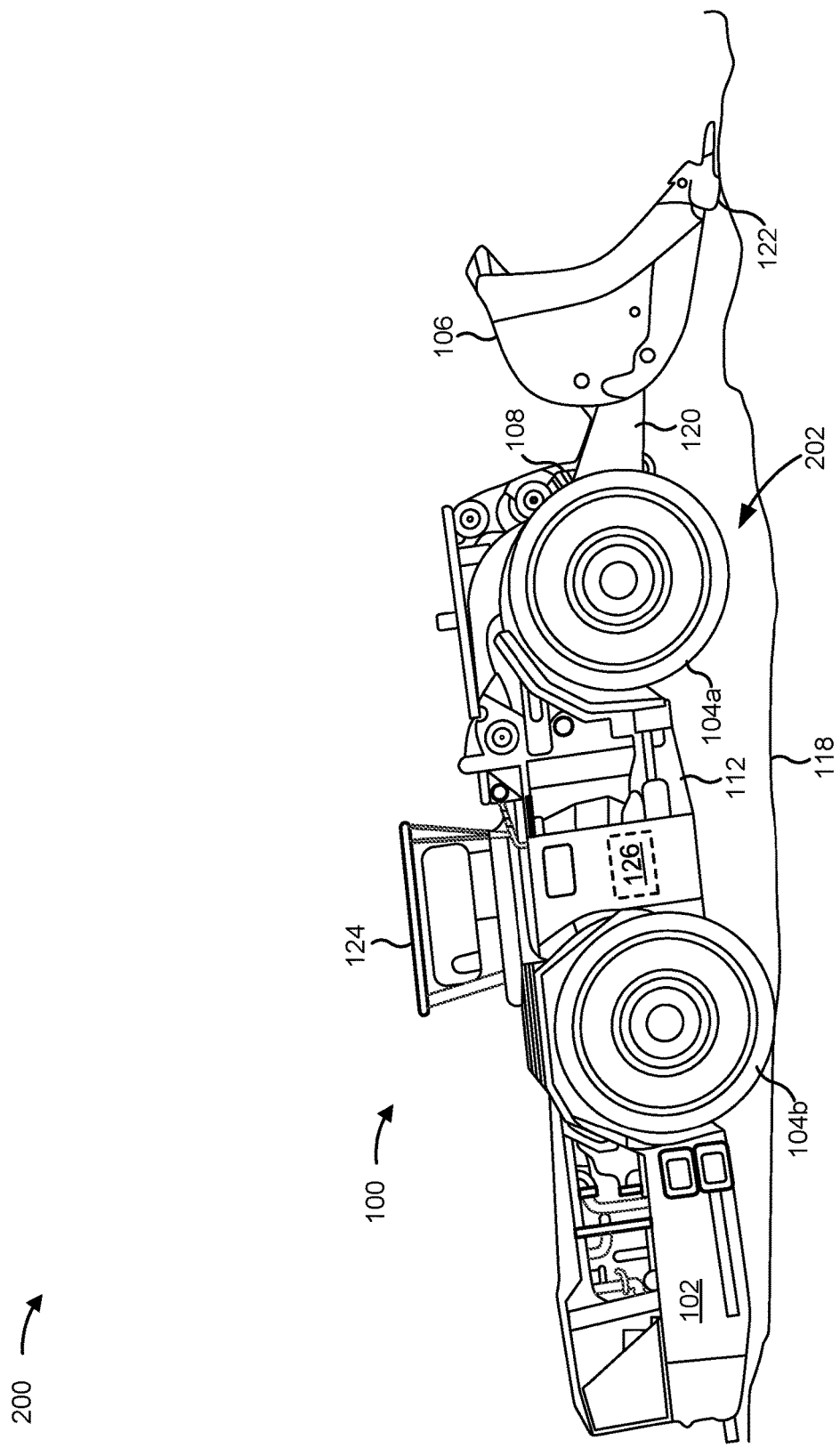
FIG. 2 is a diagram of an example of a work machine experiencing destabilization as described herein.

FIG. 2 is a diagram of an example 200 of a work machine 100 experiencing destabilization as described herein. The destabilization of the work machine 100 may be caused by an operation of the work tool 106. In some examples, the destabilization of the work machine 100 may be caused by the work tool 106 contacting the work surface 118. Although some examples are depicted and described herein in connection with the destabilization of the work machine 100 being caused by the work tool 106 contacting the work surface 118, it should be understood that the techniques and implementations described herein may be similarly applied to detect and/or mitigate destabilization of the work machine 100 that is caused by other operations of the work tool 106, such as the work tool 106 extending a distance away from the work machine 100, and/or the work tool 106 contacting another surface or object, among other examples.

As shown in FIG. 2, during an operation of the work tool 106 (e.g., a dig operation), the work tool 106 may contact the work surface 118. For example, the lower surface 122 of the work tool 106 may contact the work surface 118. For example, the work surface 118 may have an uneven terrain. In some examples, the control system 126 may determine a level of the work surface 118. The operation of the work tool 106 may include the work machine 100 moving in a direction with the work tool 106 positioned at the determined level of the work surface 118. However, when the work surface 118 is uneven (e.g., as shown in FIG. 2), the work tool 106 may contact the work surface 118, causing force to be exerted by the work tool 106 into the work surface 118. The force exerted by the work tool 106 into the work surface 118 may cause less force to be exerted on at least one of the tires of the work machine 100 (e.g., at least one of the traction devices 104a as shown in FIG. 2). For example, as shown by reference number 202, the tire(s) closest to the work tool 106 may have less force exerted on them and/or may lift from the work surface 118. It should be understood that destabilization of the work machine 100, as described herein, may occur without the tires of the work machine 100 actually lifting off of the work surface 118 as depicted in FIG. 2 (e.g., less force being exerted on the one or more tires may cause destabilization of the work machine 100 while the one or more tires are still contacting the work surface 118).

Additionally, the destabilization caused by the work tool 106 contacting the work surface 118 may cause additional force(s) to be exerted on other tire(s) of the work machine 100, such as at least one of the traction devices 104b as shown in FIG. 2. For example, one or more tires further from the work tool 106 (e.g., relative to other tires of the work machine 100) may have additional force exerted on them due to a shift in a weight distribution of the work machine 100 caused by the work tool 106 exerting force into the work surface 118. Further, one or more actuators (e.g., hydraulic cylinders) configured to operate the work tool 106 (e.g., the one or more lift actuators 108 and/or the one or more tilt actuators 110) may support an additional load as a result of the work tool 106 exerting force into the work surface 118. For example, the one or more actuators (e.g., hydraulic cylinders) configured to operate the work tool 106 may support more weight of the work machine 100 (e.g., as compared to normal operation) because the work tool 106 is contacting and/or exerting force into the work surface 118 (e.g., when not intended by an operation of the work tool 106).

The control system 126 may be configured to detect such destabilization of the work machine 100. The control system 126 is configured to detect a destabilization event using load information (e.g., pressure information and/or force or weight information) of the work machine 100. For example, the control system 126 may monitor an air pressure (e.g., an air pressure inside of one or more tires) of the one or more traction devices 104 and a fluid pressure inside the one or more actuators (e.g., hydraulic cylinders) configured to operate the work tool 106 to detect a destabilization event caused by an operation of the work tool 106, as described in more detail elsewhere herein. As used herein, "destabilization event" may refer to an event or scenario in which control of the work machine 100 becomes destabilized or reduced. As an example, a destabilization event may include the work tool 106 contacting and/or exerting force (e.g., an excessive amount of force) into the work surface 118 (e.g., when not intended by an operation of the work tool 106). As used herein, an "excessive" amount of force may refer to a level of force that is greater than or equal to a force threshold. As another example, a destabilization event may include the work tool 106 extending a distance away from the work machine 100 in a manner that causes a weight distribution of the work machine to shift, causing destabilization of the work machine 100.

As indicated above, FIG. 2 is provided as an example. Other examples may differ from what is described with regard to FIG. 2.

Figure 3:
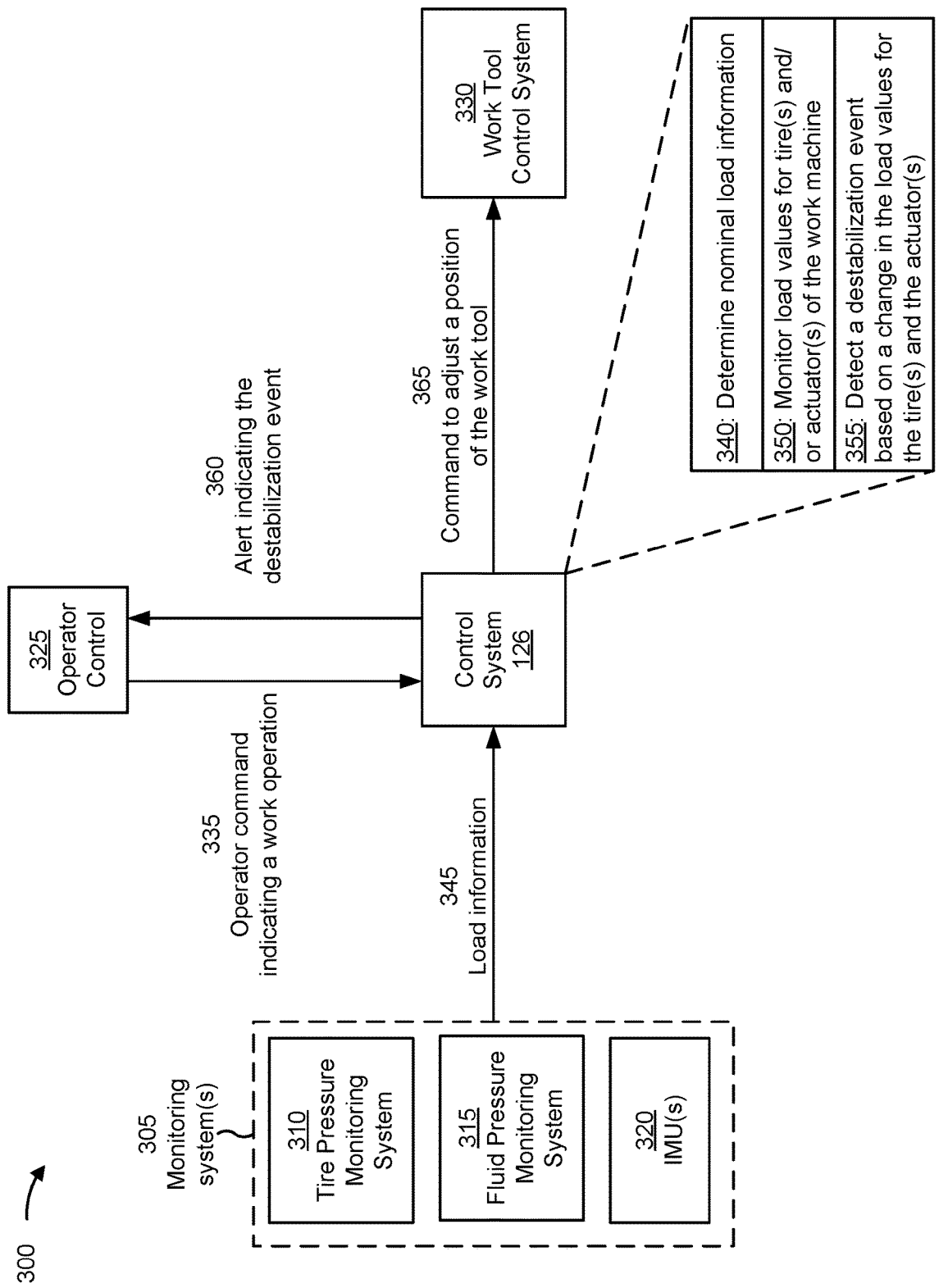
FIG. 3 is a diagram of an example of a work machine stabilization as described herein.

FIG. 3 is a diagram of an example 300 of a work machine stabilization system as described herein. As shown in FIG. 3, the control system 126 may be configured to communicate with one or more monitoring systems 305. The one or more monitoring systems 305 may include a first monitoring system configured to monitor an air pressure (e.g., a tire pressure) of the one or more traction devices 104 (e.g., a tire pressure monitoring system 310), a second monitoring system configured to monitor a fluid pressure of one or more actuators (e.g., a fluid pressure monitoring system 315), and/or a third monitoring system configured to monitor weight loads at one or more positions of the work machine 100 (e.g., one or more IMUs 320), among other examples.

The control system 126 may be configured to communicate with an operator control component 325. The operator control component 325 may be included in the work machine 100 (e.g., in the cab 124). In other examples, the operator control component 325 may be remote from the work machine 100, such as when the work machine is remotely controlled. The operator control component 325 may be configured to obtain operator inputs and/or provide (or display) information for an operator of the work machine 100. The operator control component 325 may include an input device for operating and/or driving the work machine 100. The operator control component 325 may be configured for manipulation (e.g., by an operator) in one or more motions (e.g., a forward motion, a rearward motion, a leftward motion, a rightward motion, and/or motions therebetween). The operator control component 325 may include a joystick (e.g., a single-axis joystick or a multiple-axis joystick), a lever, and/or a knob, among other examples. The operator control component 325 may include a device (e.g., a display device and/or an output device) that is configured to provide information to the operator. The device may include a screen, one or more lights, and/or a speaker, among other examples. The operator control component 325 may include one or more additional operator controls for performing other operations of the work machine 100, such as one or more inputs for initiating a work operation of the work tool 106.

For example, the operator control component 325 may include one or more inputs that, when selected, cause the work machine 100 to perform a given work operation of the work tool 106, such as a semi-automated (or fully automated) dig operation in an example where the work tool 106 is a bucket. For example, the control system 126 may be configured to cause the work tool 106 to be positioned in a given location and/or to perform one or more operations (e.g., to move between one or more positions), among other examples, in response to obtaining an operator input indicating that the work operation is to be performed. The control system 126 may communicate with a work tool control system 330 to cause the work tool 106 to perform one or more operations (e.g., to move a position of the work tool 106 and/or to initiate or stop an operation of the work tool 106). In some examples, the work tool control system 330 may be, or may be included in, the control system 126.

As shown by reference number 335, the control system 126 may obtain an operator command indicating a work operation of the work tool 106. For example, the operator command may indicate that the work operation is to be performed by the work tool 106 and/or the work machine 100. The control system 126 may obtain the operator command from the operator control component 325. The operator command may indicate that the work operation is to be performed (e.g., is to be initiated). For example, the operator command may include instructions that the work machine 100 and/or work tool 106 is to perform the work operation (e.g., the operator control component 325 may obtain an operator input that is specific to causing the work operation to be performed). As another example, the control system 126 may determine that the work operation is to be performed based on one or more input(s) obtained from the operator control component 325. For example, the control system 126 may obtain one or more operator commands that are associated with causing the work tool 106 to perform one or more operations. The control system 126 may determine that the one or more operations are included in the work operation. As an example, the work operation may include a dig operation, a material removal operation, a lift operation, a movement operation (e.g., associated with the work tool 106 moving to a given position or location), and/or another work operation of the work tool 106.

The work operation may be associated with a duration. For example, the work operation may be associated with one or more steps or operations. The control system 126 may determine that the work operation is being performed (e.g., for a duration) based on an amount of time associated with performing the one or more steps or operations. Additionally, or alternatively, the control system 126 may be configured to cause the work operation to be performed until the control system obtains an operator command (e.g., from the operator control component 325) indicating that the work operation is to be stopped or terminated.

As shown by reference number 340, the control system 126 may determine nominal load information for the work machine 100. The nominal load information may be calibrated nominal values for the work operation. The nominal load information may be initial loads of the first one or more traction devices 104 (e.g., the first one or more tires), the second one or more traction devices 104 (e.g., the second one or more tires), and the one or more actuators at the start of the work operation. For example, the control system 126 may determine the nominal load information based on, or in response to, obtaining the operator command indicating the work operation. The control system 126 may determine a current pressure value (e.g., air pressure value or tire pressure value) for one or more traction devices 104 (e.g., one or more tires) of the work machine 100 at, or near, a time at which the work operation is initiated. For example, the control system 126 may determine a first current (or nominal) pressure value for a first one or more traction devices 104 (e.g., one or more tires) of the work machine 100 and a second current (or nominal) pressure value for a second one or more traction devices 104 (e.g., one or more tires) of the work machine 100. The first one or more traction devices 104 may be located closer to the work tool 106 relative to the second one or more traction devices 104. In some examples, the first one or more traction devices 104 may be front or back traction device(s) 104 and the second one or more traction devices 104 may be back or front traction device(s) 104 (e.g., if the work tool 106 is mounted on a front or back of the work machine 100). As an example, referring back to FIG. 2, the first one or more traction devices 104 may be the traction device(s) 104a (e.g., that are closer to the work tool 106) and the second one or more traction devices 104 may be the traction device(s) 104b (e.g., that are further from the work tool 106). In other examples, the first one or more traction devices 104 may be left or right traction device(s) 104 and the second one or more traction devices 104 may be right or left traction device(s) 104 (e.g., if the work tool 106 is mounted on a side of the work machine 100).

The control system 126 may determine a current pressure value (e.g., fluid pressure value) of one or more actuators that are configured to actuate and/or control an operation of the work tool 106. For example, the work tool 106 may be configured to be actuated via one or more actuators, such as the one or more lift actuators 108, and/or the one or more tilt actuators 110, among other examples. The control system 126 may determine (e.g., via the fluid pressure monitoring system 315) a pressure value of fluid in respective actuators of the one or more actuators. Additionally, or alternatively, the control system 126 may determine the nominal pressure value for the one or more actuators based on the work operation. For example, the work operation may be associated with an expected load or weight that is expected to be exerted on the work tool 106. The control system 126 may determine the nominal pressure value for the one or more actuators based on the expected load or weight that is expected to be exerted on the work tool 106 during the work operation.

In some implementations, the control system 126 may determine a current (or nominal) weight distribution of the work machine 100 (e.g., via the one or more IMUs 320). For example, the weight distribution may indicate a distribution of weight between a front end and a back end of the work machine 100. The current (or nominal) weight distribution of the work machine 100 may indicate a first weight or force on the first one or more traction devices 104 and a second weight or force on the second one or more traction devices 104.

In some implementations, the control system 126 may determine one or more thresholds for the destabilization event monitoring to be performed during the work operation. The control system 126 may determine the one or more thresholds based on the work operation (e.g., different work operations may be associated with different thresholds). The control system 126 may determine the one or more thresholds based on the nominal load information of the work machine 100. The one or more thresholds may define an expected operating range of load values for different components of the work machine 100 during the work operation. For example, the one or more thresholds may define an upper bound of air pressure (or tire pressure) for one or more traction device(s) 104 (e.g., the second one or more traction devices 104), a lower bound of air pressure (or tire pressure) for one or more traction device(s) 104 (e.g., the first one or more traction devices 104), and/or an upper bound of fluid pressure of the one or more actuators, among other examples. As another example, the one or more thresholds may define an allowable variance in the load information from the determined nominal load information during the work operation. The variance may refer to an absolute difference between two values and/or a percentage difference, among other examples.

The control system 126 may use the current (or nominal) load information to calibrate the values and/or thresholds for destabilization event monitoring to be performed during the work operation. For example, by determining the nominal load information based on, or in response to, obtaining the operator command indicating the work operation, the control system 126 may calibrate the load information of the work machine 100 based on current operating conditions of the work machine 100 and/or current information of different components of the work machine 100, thereby improving the accuracy of the destabilization event monitoring.

As shown by reference number 345, the control system 126 may obtain load information of the work machine 100. The control system 126 may obtain the load information from the one or more monitoring systems 305. For example, the control system 126 obtains air pressure information (e.g., tire pressure information) of the one or more traction devices 104 (e.g., via the tire pressure monitoring system 310), fluid pressure information of the one or more actuators (e.g., via the fluid pressure monitoring system 315), and/or weight distribution information of the work machine 100 (e.g., via the one or more IMUs), among other examples.

As shown by reference number 350, the control system 126 may monitor, via the one or more monitoring systems 305, the load information of the work machine during the work operation. For example, during the work operation, the control system 126 may (e.g., periodically) obtain the load information from the one or more monitoring systems 305. The control system 126 may compare the obtained load information to the nominal load information and/or to the one or more thresholds.

For example, the control system 126 may obtain air pressure (e.g., tire pressure) information for the first one or more traction devices 104 (e.g., the first one or more tires that are closer to the work tool 106 relative to the second one or more traction devices 104). The control system 126 may determine whether an air pressure (e.g., a tire pressure) of the first one or more traction devices 104 satisfies a first pressure threshold (e.g., a lower bound or an upper bound for the pressure of the first one or more traction devices 104). As another example, the control system 126 may determine whether a difference between an air pressure (e.g., a tire pressure) of the first one or more traction devices 104 and a nominal pressure of the first one or more traction devices 104 satisfies a threshold (e.g., a first tire pressure threshold). Similarly, the control system 126 may obtain air pressure (e.g., tire pressure) information for the second one or more traction devices 104 (e.g., the second one or more tires that are further from the work tool 106 relative to the first one or more traction devices 104). The control system 126 may determine whether an air pressure (e.g., a tire pressure) of the second one or more traction devices 104 satisfies a second pressure threshold (e.g., an upper bound or a lower bound for the pressure of the second one or more traction devices 104). As another example, the control system 126 may determine whether a difference between an air pressure (e.g., a tire pressure) of the second one or more traction devices 104 and a nominal pressure of the second one or more traction devices 104 satisfies a threshold (e.g., a second tire pressure threshold).

In some examples, rather than using pressure information (e.g., tire pressure or air pressure) of the traction device(s) 104, the control system 126 may use load or weight information of the traction device(s) 104. For example, the one or more IMUs 320 and/or other sensor(s) may be configured to determine a weight or force being applied to the traction device(s) 104. The control system 126 may monitor the weight being applied to the one or more traction devices 104 during the work operation in a similar manner as described herein.

The control system 126 may obtain fluid pressure information for an actuator that is configured to actuate and/or control an operation of the work tool 106. The control system 126 may determine whether a fluid pressure of the actuator satisfies a third pressure threshold (e.g., a an upper bound for the pressure of the actuator). As another example, the control system 126 may determine whether a difference between the fluid pressure (e.g., cylinder pressure or hydraulic fluid pressure) of the actuator and a nominal pressure of the actuator satisfies a threshold (e.g., a fluid pressure threshold).

The control system 126 may obtain weight distribution information for the work machine 100 during the work operation. The control system 126 may determine whether a difference in the weight distribution satisfies a distribution threshold. For example, the control system 126 may determine whether a weight distribution of the work machine 100 has shifted, to indicate a destabilization event.

As shown by reference number 355, the control system 126 may detect a destabilization event based on a change in load values for the traction device(s) 104 and the actuator(s) of the work machine 100 (e.g., during the work operation). For example, the control system 126 may detect the destabilization event based on a combination of a change in pressure in (or weight on) the first one or more traction devices 104, a change in pressure in (or weight on) the second one or more traction devices 104, and a change in pressure in the one or more actuators. As an example, a combination of a decrease in the pressure in (or weight on) the first one or more traction devices 104, an increase in the pressure in (or weight on) the second one or more traction devices 104, and an increase in the pressure in the one or more actuators may be indicative of a destabilization event occurring in connection with the work operation of the work tool 106. In other examples, a combination of an increase in the pressure in (or weight on) the first one or more traction devices 104, a decrease in the pressure in (or weight on) the second one or more traction devices 104, and an increase in the pressure in the one or more actuators may be indicative of a destabilization event occurring in connection with the work operation of the work tool 106.

For example, the change in pressure in (or weight on) the first one or more traction devices 104 and the change in pressure in (or weight on) the second one or more traction devices 104 is indicative that a weight distribution of the work machine 100 has shifted during the work operation (e.g., indicating that the work tool 106 has contacted the work surface 118 and/or that excessive force is being applied to or by the work tool 106). Additionally, the change (e.g., increase) in pressure in the one or more actuators configured to actuate or operate the work tool 106 may indicate that the work tool 106 has contacted the work surface 118 and/or that excessive force is being applied to or by the work tool 106. For example, the combination in the change in pressure in (or weight on) the first one or more traction devices 104, the change in pressure in (or weight on) the second one or more traction devices 104, and the change (e.g., increase) in pressure in the one or more actuators configured to actuate or operate the work tool 106 may be indicative of the weight distribution of the work machine 100 having shifted, and of the work tool 106 supporting a weight of the work machine 100 (e.g., thereby indicating that the work tool 106 has contacted the work surface 118, another surface, or an object).

The control system 126 may detect the destabilization event based on a first difference in tire pressure, indicated by first tire pressure information of the first one or more traction devices 104, satisfying a first tire pressure threshold. Additionally, the control system 126 may detect the destabilization event based on a second difference in tire pressure, indicated by the second tire pressure information of the second one or more one or more traction devices 104, satisfying a second tire pressure threshold. Additionally, the control system 126 may detect the destabilization event based on a difference in fluid pressure, indicated by fluid pressure information, of the one or more actuators satisfying a fluid pressure threshold. In other words, the control system 126 may detect the destabilization event based on a first relative difference (e.g., a decrease or increase in the tire pressure relative to the nominal pressure of the first one or more traction devices 104) in the first one or more traction devices 104 during the work operation satisfying a first tire pressure threshold, a second relative difference (e.g., a decrease or increase in the tire pressure relative to the nominal pressure of the second one or more traction devices 104) in the second one or more traction devices 104 during the work operation satisfying a second tire pressure threshold, and a third relative difference (e.g., a decrease or increase in the fluid pressure relative to the nominal pressure of the one or more actuators) in the one or more fluid pressures of the one or more actuators during the work operation satisfying a fluid pressure threshold.

The control system 126 may detect the destabilization event based on the detected changes in pressure (e.g., air pressure, tire pressure, and/or fluid pressure) of the one or more traction devices 104 and the one or more actuators occurring at, or near, the same time. For example, the control system 126 may detect the change in pressure (e.g., tire pressure) of the first one or more traction devices 104 at a first time, the change in pressure (e.g., tire pressure) of the second one or more traction devices 104 at a second time, and the change in pressure (e.g., fluid pressure) of the one or more actuators at a third time. The control system 126 may detect the destabilization event based on a difference between the first time, the second time, and the third time satisfying a time threshold (e.g., a difference between the first time and the second time satisfies the time threshold, a difference between the first time and the third time satisfies the time threshold, and a difference between the second time and the third time satisfies the time threshold). As another example, the control system 126 may detect the destabilization event based on the first time, the second time, and the third time occurring within a time window having a defined duration (e.g., based on the detected changes all occurring within X seconds of each other).

In some implementations, the control system 126 may, in addition to the considerations described elsewhere herein, detect the destabilization event based on a change in weight distribution information of the work machine 100. For example, the control system 126 may monitor, during the work operation, a first weight of a first end of the work machine 100 (e.g., that is closer to the work tool 106) and a second weight of a second end of the work machine 100 (e.g., that is further from the work tool 106 relative to the first end). The control system 126 may detect the destabilization event based on detecting that the weight distribution information indicates that the first weight has decreased by a first weight threshold and/or the second weight has increased by a second weight threshold. In other words, the control system 126 may use information provided by IMU(s) 320 positioned near, or at, the first end and the second end of the work machine 100 to detect a shift in the weight distribution that indicates that a destabilization event is occurring. For example, if the operation of the work tool 106 is causing a destabilization event, the weight distribution across the work machine 100 is shifted toward or away from the work tool 106 (e.g., depending on the work operation being performed via the work tool 106). Therefore, the change in weight distribution is an additional factor that is indicative of the destabilization event occurring.

The control system 126 may perform one or more actions based on, or in response to, detecting the destabilization event. For example, the one or more actions may mitigate or address the destabilization event. For example, as shown by reference number 360, the control system 126 may provide, to the operator control component 325, an alert (or notification) indicating the destabilization event. For example, the control system 126 may provide (e.g., for display output by the operator control component 325) an operator alert indicating the destabilization event (e.g., indicating that the destabilization event is detected). The operator control component 325 may display or output an indication that the destabilization event has been detected. For example, the operator control component may cause a display device (e.g., a light, a light emitting diode (LED), or a graphical element displayed via a display screen) to output a visual indication that the destabilization event is detected. As another example, the operator control component 325 may output (e.g., via a speaker) an audio indication that the destabilization event is detected.

Additionally, or alternatively, the one or more actions performed by the control system 126 may include controlling an operation and/or position of the work tool 106 based on, or in response to, detecting the destabilization event. For example, the control system 126 may adjust a position of the work tool 106. The control system 126 may adjust the position of the work tool by communicating with the work tool control system 330. For example, as shown by reference number 365, the control system 126 may provide, and the work tool control system 330 may obtain, a command to adjust the position of the work tool.

For example, the control system 126 may cause the work tool 106 to be adjusted to an adjusted position. The control system 126 may determine the adjusted position based on updated load information for the work machine when the work tool 106 is in the adjusted position. For example, the adjusted position may be a position in which a first updated pressure, of the first one or more traction devices 104, is within a first variance of a first nominal pressure (e.g., of the first one or more traction devices), a second updated pressure, of the second one or more traction devices 104, is within a second variance of a second nominal pressure (e.g., of the second one or more traction devices 104), and an updated fluid pressure, of the one or more actuators, is within a third variance of a nominal fluid pressure. In other words, the control system 126 may adjust the position of the work tool 106 until the air pressure(s) (e.g., tire pressures) of the one or more traction devices 104 and the fluid pressure(s) of the one or more actuators are at, or close to, the nominal levels determined by the control system 126 (e.g., as described in connection with reference number 340).

During the work operation, if a destabilization event is detected, then the control system 126 may cause the position of the work tool 106 to be adjusted to mitigate or address the destabilization event. The control system may (e.g., periodically) adjust the position of the work tool toward a prior position (e.g., at or closer to the position in which the work tool 106 was located when the destabilization event was detected) over time. As an example, the destabilization event may be caused by the work tool 106 contacting the work surface 118 due to an unevenness of the work surface 118. The control system 126 may cause the work tool 106 to be raised until the tire pressure(s) (e.g., of the one or more traction devices 104) and/or fluid pressure(s) (e.g., of the one or more actuators) return within normal levels for the work operation (e.g., are within a variance of the nominal load levels). The control system 126 may cause (e.g., after a given amount of time) the work tool 106 to be lowered by a given distance (e.g., after raising the work tool 106 in response to detecting the destabilization event). If, after some time, no destabilization event is detected by the control system, then the control system 126 may again cause (e.g., after a given amount of time) the work tool 106 to be lowered by a given distance. The control system 126 may continue such operations (e.g., raising the work tool 106 in response to detecting a destabilization event and periodically lowering the work tool 106 until a destabilization event is detected) during the work operation. This enables the control system to control (e.g., autonomously) the position of the work tool 106 during a work operation to maximize the efficiency of the work tool without causing damage to the work machine 100 or the work tool 106, such as in scenarios where the work tool 106 is to be positioned close to, or at, the work surface 118, and the work surface 118 is uneven.

The control system 126 may control an operation of the work tool 106 based on, or in response to, detecting the destabilization event. For example, the work tool 106 may include one or more components that are configured to be powered on or off to perform the work operation, such as a saw, a drill, a trencher, or another component. The control system 126 may cause the one or more components to stop operation (e.g., to be powered off) based on, or in response to, detecting the destabilization event. As another example, the control system 126 may adjust a speed of the work machine 100 based on, or in response to, detecting the destabilization event. For example, the control system 126 may cause a speed of the work machine 100 to be reduced based on, or in response to, detecting the destabilization event. If the destabilization event is not mitigated or addressed (e.g., by the control system performing the one or more operations, as described herein), then the control system 126 may cause the work machine 100 to come to a stop. For example, if the control system 126 detects the destabilization event for a given amount of time (e.g., if the amount of time that the destabilization event is detected satisfies a time threshold), then the control system 126 may cause the work machine 100 to come to a stop.

As indicated above, FIG. 3 is provided as an example. Other examples may differ from what is described with regard to FIG. 3.

Figure 4:
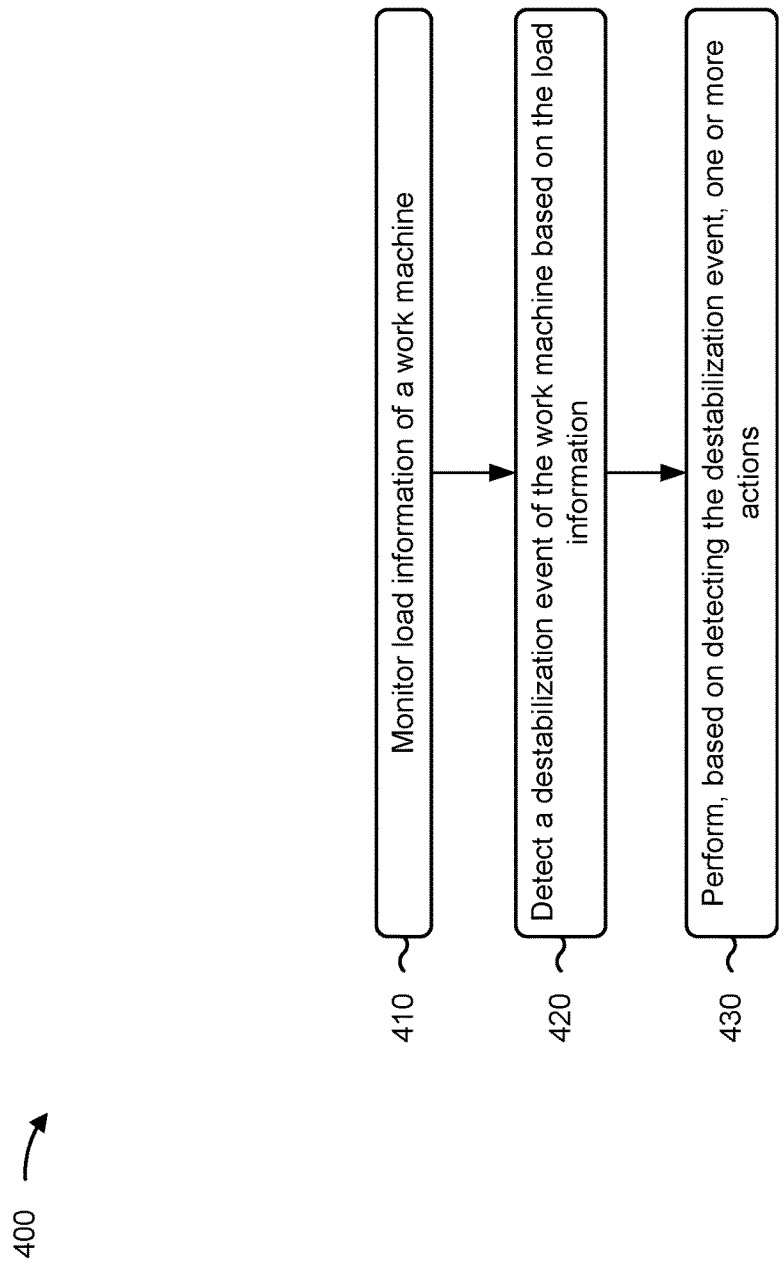
FIG. 4 is a flowchart of an example process associated with work machine stabilization.

FIG. 4 is a flowchart of an example process 400 associated with work machine stabilization. One or more process blocks of FIG. 4 may be performed by a control system (e.g., control system 126 and/or one or more controllers). Additionally, or alternatively, one or more process blocks of FIG. 4 may be performed by another device or a group of devices separate from or including the control system, such as another device or component that is internal or external to the work machine 100.

As shown in FIG. 4, process 400 may include monitoring load information of the work machine (block 410). For example, the control system may monitor load information of the work machine, as described above. In some implementations, the load information includes: first tire pressure information of a first one or more tires, second tire pressure information of a second one or more tires that are positioned further from the work tool relative to the first one or more tires, and fluid pressure information of one or more actuators configured to actuate the work tool.

In some implementations, process 400 includes obtaining an operator command indicating that a work operation is to be performed, and monitoring the load information includes monitoring, during a duration of the work operation, the load information.

As further shown in FIG. 4, process 400 may include detecting a destabilization event of the work machine based on the load information (block 420). For example, the control system may detect a destabilization event of the work machine based on the load information. In some implementations, the control system may detect the destabilization event based on: a decrease in tire pressure, indicated by the first tire pressure information, of the first one or more tires satisfying a first tire pressure threshold, an increase in tire pressure, indicated by the second tire pressure information, of the second one or more tires satisfying a second tire pressure threshold, and an increase in fluid pressure, indicated by the fluid pressure information, of the one or more actuators satisfying a fluid pressure threshold, as described above. In some implementations, the destabilization event is indicative of the work tool being in contact with a work surface causing a lift of the work machine.

As further shown in FIG. 4, process 400 may include performing, based on detecting the destabilization event, one or more actions (block 430). For example, the control system may perform, based on detecting the destabilization event, one or more actions, as described above. In some implementations, performing the one or more actions includes providing an operator alert indicating the destabilization event.

In some implementations, performing the one or more actions includes modifying a position of the work tool, causing an increase in the tire pressure of the first one or more tires to a first adjusted tire pressure that is within a first variance of a first nominal tire pressure, a decrease in the tire pressure of the second one or more tires to a second adjusted tire pressure that is within a second variance of a second nominal tire pressure, and a decrease in the fluid pressure of the one or more actuators to an adjusted fluid pressure that is within a third variance of a nominal fluid pressure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

In some scenarios, operation of a work tool may cause a work machine to become destabilized. For example, the work tool may contact a work surface (e.g., the ground) during operation and exert force on the work surface, causing a destabilization of the work machine. For example, the work tool contacting the work surface may cause a weight or force on one or more tires of the work machine to be reduced (e.g., because of the reduced traction caused by the reduced weight or force on one or more tires of the work machine), may cause a reduction in operator control of the work machine, may cause the work tool to dig into the work surface, and/or may cause a reduction in the work tool efficiency, among other examples.

However, it may be difficult to detect when destabilization events that are caused by work tool operation occur. For example, a system of the work machine may determine that the work tool is at work surface level (e.g., at ground level) using a position of a linkage system of the work tool. However, work surfaces are often uneven. As a result, using the geometry of the linkage system may be an unreliable mechanism to determine when the work tool is at work surface level (e.g., at ground level). Additionally, the work machine may be autonomous and/or remotely operated. Therefore, an operator may be unable to detect when destabilization events that are caused by work tool operation occur because the operator may not be in a cab of the work machine. As a result, the work machine may be destabilized, damage to the work machine and/or work tool can occur, and/or an efficiency of an operation of the work machine and/or the work tool may be reduced. Further, environments in which the work machine operates may not be conducive to ground level detection systems (e.g., a system configured to detect where ground level is relative to the work tool), such as LiDAR systems, camera systems, and/or radar systems, among other examples.

Some implementations described herein enable work machine stabilization. For example, a control system (e.g., one or more controllers) of the work machine may monitor (e.g., during a work operation performed via the work tool) first pressure information (e.g., a tire pressure) of a first one or more tires (e.g., that are closer to the work tool), second pressure information (e.g., a tire pressure) of a second one or more tires (e.g., that are further from the work tool relative to the first one or more tires), and fluid pressure of one or more actuators configured to actuate or control an operation of the work tool, to detect a destabilization event. For example, the control system may detect a destabilization event based on a combination of detecting a change in tire pressure of the first one or more tires (e.g., a decrease in tire pressure of the first one or more tires), detecting a change in tire pressure of the second one or more tires (e.g., an increase in tire pressure of the second one or more tires), and detecting a change in fluid pressure of the one or more actuators (e.g., an increase in the fluid pressure of the one or more actuators). A change in the tire pressure of the first one or more tires, a change in the tire pressure of the second one or more tires, and a change in fluid pressure of the one or more actuators occurring at, or near, the same time is indicative of a destabilization event occurring. The control system may perform one or more actions to mitigate or address the destabilization event based on, or in response to, detecting the destabilization event.

As a result, the control system is configured to reliably detect destabilization events caused by an operation of a work tool of the work machine. For example, the combination of using tire pressure information of different sets of tires of the work machine and using fluid pressure of one or more actuators (e.g., that are configured to actuate or control a position of the work tool) results in a more accurate detection of the destabilization events. For example, the pressure(s) of each set of one or more tires and/or the actuators may independently change due to other factors, such as temperature, load of materials on the work tool, and/or terrain conditions of the work surface, among other examples. Therefore, using the combination of using tire pressure information of different sets of tires of the work machine and using fluid pressure of one or more actuators (e.g., that are configured to actuate or control a position of the work tool) enables the control system to eliminate inaccurate destabilization event detections that would otherwise be caused by the other factors.

By using the combination of using tire pressure information of different sets of tires of the work machine and using fluid pressure of one or more actuators (e.g., that are configured to actuate or control a position of the work tool) a complexity of the destabilization event detections is reduced (e.g., because complex equipment and/or determinations are not needed to detect the destabilization events). Further, by performing the one or more actions, the control system may reduce a likelihood or mitigate damage to the work machine and/or the work tool that may otherwise be caused by the destabilization event(s). For example, by providing an operator alert, an operator may be enabled to adjust a position or operation of the work tool to reduce a likelihood or mitigate damage to the work machine and/or the work tool. As another example, by the control system adjusting the position of the work tool, the control system may reduce a likelihood or mitigate damage to the work machine and/or the work tool (e.g., without requiring operator intervention).

Additionally, by monitoring load information and/or detecting destabilization events during a work operation (e.g., only when a work operation is being performed via the work tool), the control system may tailor the destabilization event detections to current operating conditions of the work machine. For example, the control system may determine nominal load information of the work machine at a start of the work operation to enable the control system to calibrate and/or tailor the destabilization event detections to the operating conditions and/or load information at the start of the work operation. This reduces a likelihood of inaccurate destabilization event detections that would otherwise be caused by natural shifts or changes in pressure or load information of the work machine over time (e.g., shifts or changes in tire pressure caused by temperature changes or refilling of the tire(s)).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A work machine, comprising:
   a work tool that is configured to be actuated via one or more actuators;
   a first one or more tires;
   a second one or more tires that are positioned further from the work tool relative to the first one or more tires; and
   one or more controllers configured to:
      monitor, via one or more monitoring systems, load information of the work machine, the load information including:
         first tire pressure information of the first one or more tires,
         second tire pressure information of the second one or more tires, and
         fluid pressure information of the one or more actuators;

detect a destabilization event of the work machine based on:
a first difference in tire pressure, indicated by the first tire pressure information, of the first one or more tires satisfying a first tire pressure threshold,
a second difference in tire pressure, indicated by the second tire pressure information, of the second one or more tires satisfying a second tire pressure threshold, and
a difference in fluid pressure, indicated by the fluid pressure information, of the one or more actuators satisfying a fluid pressure threshold; and
perform, based on the detection of the destabilization event, one or more actions.

2. The work machine of claim 1, wherein the one or more controllers are further configured to:
obtain an operator command indicating that a work operation is to be performed; and
wherein the one or more controllers, to monitor the load information, are configured to:
monitor, during a duration of the work operation, the load information.

3. The work machine of claim 1, wherein the one or more controllers, to perform the one or more actions, are configured to:
modify a position of the work tool to cause:
the first tire pressure information to indicate that a first adjusted tire pressure is within a first variance of a first nominal tire pressure,
the second tire pressure information to indicate that a second adjusted tire pressure is within a second variance of a second nominal tire pressure, and
the fluid pressure information to indicate that an adjusted fluid pressure is within a third variance of a nominal fluid pressure.

4. The work machine of claim 3, wherein the first nominal tire pressure is based on a first initial tire pressure of the first one or more tires at a start of a work operation,
wherein the second nominal tire pressure is based on a second initial tire pressure of the second one or more tires at the start of the work operation, and
wherein the nominal fluid pressure is based on an initial fluid pressure of the one or more actuators at the start of the work operation.

5. The work machine of claim 1, wherein the one or more controllers, to perform the one or more actions, are configured to:
provide an operator alert indicating the destabilization event.

6. The work machine of claim 1, wherein the destabilization event is indicative of the work tool being in contact with a work surface.

7. The work machine of claim 1, wherein the one or more actuators include at least one of:
a lift actuator, or
a tilt actuator.

8. The work machine of claim 1, wherein the first difference in tire pressure indicates a decrease in tire pressure of the first one or more tires,
wherein the second difference in tire pressure indicates an increase in tire pressure of the second one or more tires, and
wherein the difference in fluid pressure indicates an increase in fluid pressure of the one or more actuators.

9. A system for work machine stabilization, the system comprising:
one or more controllers configured to:
monitor, during a work operation associated with a work tool of a work machine,
tire pressure information indicating:
a first one or more tire pressures of a first one or more tires of the work machine, and
a second one or more tire pressures of a second one or more tires of the work machine,
wherein the first one or more tires are positioned on the work machine closer to the work tool relative to the second one or more tires;
monitor, during the work operation, fluid pressure information indicating one or more fluid pressures of one or more actuators that are configured to move the work tool;
detect a destabilization event of the work machine based on:
a first relative difference in the first one or more tire pressures during the work operation satisfying a first tire pressure threshold,
a second relative difference in the second one or more tire pressures during the work operation satisfying a second tire pressure threshold, and
a third relative difference in the one or more fluid pressures during the work operation satisfying a fluid pressure threshold; and
perform, based on the destabilization event, one or more actions.

10. The system of claim 9, wherein the one or more controllers are further configured to:
obtain an operator command indicating that the work operation is to be performed.

11. The system of claim 9, wherein the one or more controllers, to perform the one or more actions, are configured to:
provide, for display or output, an operator alert indicating that the destabilization event is detected.

12. The system of claim 9, wherein the one or more controllers, to perform the one or more actions, are configured to:
adjust a position of the work tool.

13. The system of claim 12, wherein the one or more controllers, to adjust the position of the work tool, are configured to:
adjust the position of the work tool to an adjusted position in which:
a first updated tire pressure, of the first one or more tires, is within a first variance of a first nominal tire pressure,
a second updated tire pressure, of the second one or more tires, is within a second variance of a second nominal tire pressure, and
an updated fluid pressure, of the one or more actuators, is within a third variance of a nominal fluid pressure.

14. The system of claim 9, wherein the first relative difference is a first difference between a first tire pressure of the first one or more tire pressures at a first time during the work operation and a second tire pressure of the first one or more tire pressures at a second time during the work operation,
wherein the second relative difference is a second difference between a third tire pressure of the second one or more tire pressures at the first time and a fourth tire pressure of the second one or more tire pressures at the second time, and wherein the third relative difference is a third difference between a first fluid pressure of the one or more fluid pressures at the first time and a second fluid pressure of the one or more fluid pressures at the second time.

15. The system of claim 9, wherein the one or more controllers are further configured to:
monitor, during the work operation, weight distribution information of the work machine, the weight distribution information indicating a first weight of a first end of the work machine and a second weight of a second end of the work machine,
wherein the first end is closer to the work tool relative to the second end; and
wherein the one or more controllers, to detect the destabilization event, are configured to:
detect that the weight distribution information indicates that at least one of the first weight has decreased by a first weight threshold or the second weight has increased by a second weight threshold.

16. A method for stabilizing a work machine having a work tool, the method comprising:
monitoring, by a control system of the work machine, load information of the work machine, the load information including:
first tire pressure information of a first one or more tires,
second tire pressure information of a second one or more tires that are positioned further from the work tool relative to the first one or more tires, and
fluid pressure information of one or more actuators configured to actuate the work tool;
detecting, by the control system, a destabilization event of the work machine based on:
a decrease in tire pressure, indicated by the first tire pressure information, of the first one or more tires satisfying a first tire pressure threshold,
an increase in tire pressure, indicated by the second tire pressure information, of the second one or more tires satisfying a second tire pressure threshold, and
an increase in fluid pressure, indicated by the fluid pressure information, of the one or more actuators satisfying a fluid pressure threshold; and
performing, by the control system and based on detecting the destabilization event, one or more actions.

17. The method of claim 16, further comprising:
obtaining an operator command indicating that a work operation is to be performed; and
wherein monitoring the load information comprises:
monitoring, during a duration of the work operation, the load information.

18. The method of claim 16, wherein performing the one or more actions comprises:
modifying a position of the work tool causing:
an increase in the tire pressure of the first one or more tires to a first adjusted tire pressure that is within a first variance of a first nominal tire pressure,
a decrease in the tire pressure of the second one or more tires to a second adjusted tire pressure that is within a second variance of a second nominal tire pressure, and
a decrease in the fluid pressure of the one or more actuators to an adjusted fluid pressure that is within a third variance of a nominal fluid pressure.

19. The method of claim 16, wherein performing the one or more actions comprises:
providing an operator alert indicating the destabilization event.

20. The method of claim 16, wherein the destabilization event is indicative of the work tool being in contact with a work surface causing a lift of the work machine.

* * * * *